US007154518B2

(12) United States Patent
Kim

(10) Patent No.: US 7,154,518 B2
(45) Date of Patent: Dec. 26, 2006

(54) PRE-HEATING SYSTEM USABLE WITH IMAGE FORMING DEVICE BASED ON BEHAVIOR PROFILE OF USER AND A METHOD THEREOF

(75) Inventor: Young-hye Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 151 days.

(21) Appl. No.: 11/039,834

(22) Filed: Jan. 24, 2005

(65) Prior Publication Data

US 2005/0179719 A1 Aug. 18, 2005

(30) Foreign Application Priority Data

Feb. 17, 2004 (KR) ..................... 10-2004-0010370

(51) Int. Cl.
*G05D 23/19* (2006.01)
*G03G 15/20* (2006.01)
*G03G 13/20* (2006.01)
*B41J 29/38* (2006.01)

(52) U.S. Cl. ........................ 347/185; 347/156; 347/19; 399/69; 399/70

(58) Field of Classification Search .................... 347/5, 347/19, 185, 212, 155, 156; 399/67, 69, 399/70

See application file for complete search history.

(56) References Cited

U.S. PATENT DOCUMENTS 6,330,069 B1 * 12/2001 Kim .......................... 358/1.14

FOREIGN PATENT DOCUMENTS

| | | |
|---|---|---|
| JP | 08-011303 | 1/1996 |
| JP | 08-076633 | 3/1996 |
| JP | 08-146840 | 6/1996 |
| JP | 2001-205897 | 7/2001 |
| JP | 2001-350388 | 12/2001 |

* cited by examiner

*Primary Examiner*—Huan Tran
(74) *Attorney, Agent, or Firm*—Stanzione & Kim, LLP

(57) ABSTRACT

A pre-heating system usable with an image forming device based on a behavior profile of a user and a method thereof including sensing, according to time, program operation patterns of at least one user executing at least one application program of at least one terminal, in order to perform data printing by using the image forming device, storing program operation patterns of each user according to time as a user profile, respectively, and if one of the users executes the application program of the terminal, counting time, and if an amount of time determined based on the user profile passes, preheating the image forming device. Accordingly, the image forming device can immediately perform a printing process without wasting pre-heating time, and the printer can be preheated only as needed, thereby reducing a waste of resources.

22 Claims, 2 Drawing Sheets

PRE-HEATING SYSTEM USABLE WITH IMAGE FORMING DEVICE BASED ON BEHAVIOR PROFILE OF USER AND A METHOD THEREOF

CROSS-REFERENCE TO RELATED APPLICATIONS

This application claims benefit under 35 U.S.C. § 119 from Korean Patent Application No. 2004-10370, filed on Feb. 17, 2004, the content of which is incorporated herein in its entirety and by reference.

BACKGROUND OF THE INVENTION

1. Field of the Invention

The present general inventive concept relates in general to an image forming device, and more particularly, to a pre-heating system usable with an image forming device based on a behavior profile of a user, and a method thereof.

2. Description of the Related Art

In general, a copying machine or a laser beam printer is an image forming device where a rotating charge roller at high pressure uniformly charges a peripheral surface of a photoconductor drum, and a laser scanning unit (LSU) scans the surface of the photoconductor drum to form an electrostatic latent image.

A developing roller to which a toner is transferred from a toner supplying roller attaches the toner on the surface of the photoconductor drum where the electrostatic latent image is formed, and develops a toner image.

A transfer voltage is applied between a transfer roller and the photoconductor drum, and the toner image is transferred onto a sheet of paper passing between the transfer roller and the photoconductor drum.

Then, the paper with the transferred toner image thereon passes through a fixing unit equipped with a heat roller and a pressure roller. At this time, the heat roller and the pressure roller apply heat and pressure to the toner image on the paper, thermally fusing the transferred toner temporarily and pressing the paper. As a result, the toner image is fixed onto the paper. In addition, a thermistor sensing a temperature of the heat roller is in contact with a surface of the heat roller and measures the temperature of the heat roller according to time, so that the heat roller can maintain a certain temperature at all times.

A typically used heat source for the fixing unit is a halogen lamp mounted inside the heat roller, or the heated roller itself is used to raise the surface temperature thereof to a predetermined level.

Therefore, to fix the toner (or the toner image) onto the paper, the heat roller should be warmed up to a predetermined temperature by heat that is generated from the heat source. That is, for a printer to print something on a sheet of paper, a pre-heating process should precede the printing.

Normally the pre-heating process takes a certain amount of time. Therefore, even though a user turns on the printer and pushes the print button, the printer cannot perform the printing process until the heat roller of the printer is warmed up to the predetermined temperature. Consequently, printing is delayed.

To prevent an unnecessary delay in printing, the heat roller of the printer could be preheated regardless of the printing process and kept at a designated temperature at all times. However, this is a waste of resources and is not very economical.

SUMMARY OF THE INVENTION

Accordingly, the present general inventive concept provides a pre-heating system usable with an image forming device based on a behavior profile of a user, and a method thereof.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a method of pre-heating an image forming device, the method comprising sensing, according to time, program operation patterns of at least one user executing at least one application program of at least one terminal in order to perform data printing by using an image forming device, storing the program operation patterns of each user according to time as a user profile, respectively, and if one of the users executes the application program of the terminal, counting time, and if an amount of time determined based on the user profile passes, preheating the image forming device.

The program operation pattern may include at least one of an application usage start time, a data print command input time from the start time, and an application end time.

The user profiles may be managed by at least one parameter between the users and the application programs, respectively.

The determined amount of time may fall in a time zone where a probability value of the user to input a print command based on the user profile exceeds a predetermined threshold value.

The method of pre-heating an image forming device may further include, if the print command is input by the user using the user terminal, calculating a hit rate of a pre-heating execute time to a print command input time, and reflecting the hit rate on the user profile.

The foregoing and/or other aspects and advantages of the present general inventive concept may also be achieved by providing a pre-heating system usable with an image forming device, the system comprising a motion sensor to sense, according to time, program operation patterns of at least one user executing at least one application program of at least one terminal in order to perform data printing by using an image forming device, a profile storage to store the program operation patterns of each user according to time as a user profile, respectively, and a pre-heating time decision unit to count time if one of the users executes the application program of the terminal and to generate a pre-heating start command of the image forming device if an amount of time calculated based on the user profile passes.

The program operation pattern may include at least one of an application usage start time, a data print command input time from the start time, and an application end time.

The user profiles may be managed by at least one parameter among at least one of the users and the application programs, respectively.

The pre-heating start command may be generated in a time zone where a probability value of the user to input a print command based on the user profile exceeds a predetermined threshold value.

In addition, if the print command is input by the user using the user terminal, the pre-heating time decision unit may calculate a hit rate of the time at which the pre-heating start command is generated to the time at which print command is input, and reflect the hit rate on the user profile.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
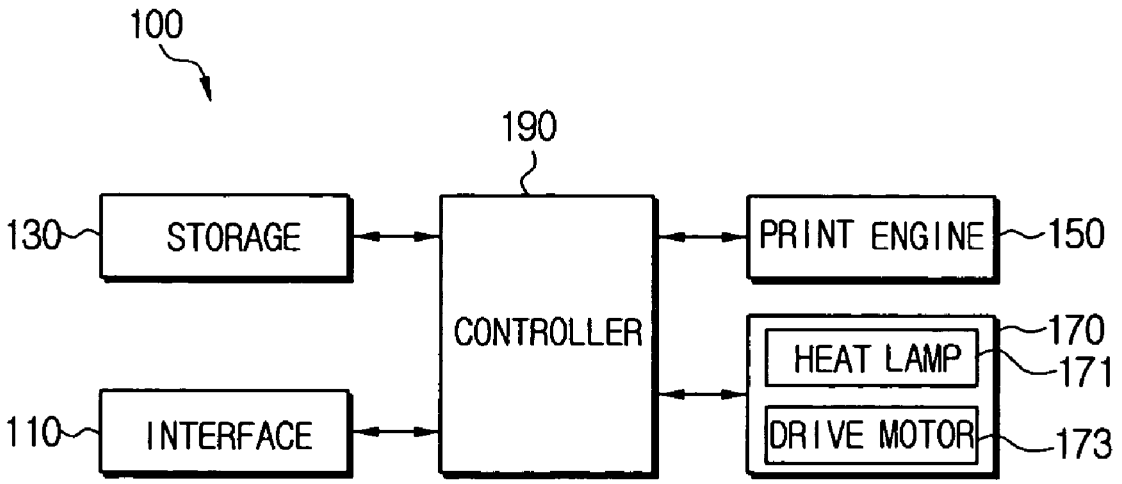
FIG. 1 is a schematic block diagram illustrating an image forming device according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 illustrates an image forming device to which an embodiment of the present general inventive concept can be applied. In particular, FIG. 1 is a schematic block diagram of a printer 100.

The printer 100 includes an interface 110, a storage 130, a print engine 150, a fixing unit 170, and a controller 190.

The printer 100 can be connected to at least one user terminal through the interface 110, and therefore, can receive through the interface 110 print data which is generated by a user executing an application program. Also, the printer 100 can receive through the interface 110 data including a control command from the user terminal, and can transmit necessary data to the user terminal through the interface 110.

The storage 130 can store all types of control programs required to implement functions of the printer 100, and the print data transmitted from the user terminal through the interface 110.

The print engine 150 transfers an image corresponding to the print data onto a sheet of paper using a developer.

The fixing unit 170 fixes the image corresponding to the print data that is transferred onto the paper by the print engine 150 to the paper by applying heat and pressure to the developer. As shown in FIG. 1, the fixing unit 170 can include a heat lamp 171 to heat a heat roller (not shown), and a drive motor 173 to rotate the heat roller and a pressure roller (not shown). Other types of heating units that can perform the intended heating operation as described herein may be used as an alternative to the heat lamp 171.

The controller 190 controls general operations of the printer 100. In particular, the controller 190 can control the operation of the heat lamp 171 of the fixing unit 170 according to a print pre-heating command, and applies heat to the heat roller (not shown) so that a surface temperature of the heat roller (not shown) is increased to a predetermined temperature required to perform a printing process, and controls the heat roller (not shown) and the drive motor 173 to transfer the paper and perform the printing process.

Moreover, the printer 100 may further comprise an operating panel (OPE) (not shown) equipped with an input unit (not shown) and a display unit (not shown). The input unit (not shown) has a plurality of function keys through which a user can set desired functions available in the printer 100, and the display unit (not shown), such as a liquid crystal display (LCD), displays a current operating status of the printer 100.

Figure 2:
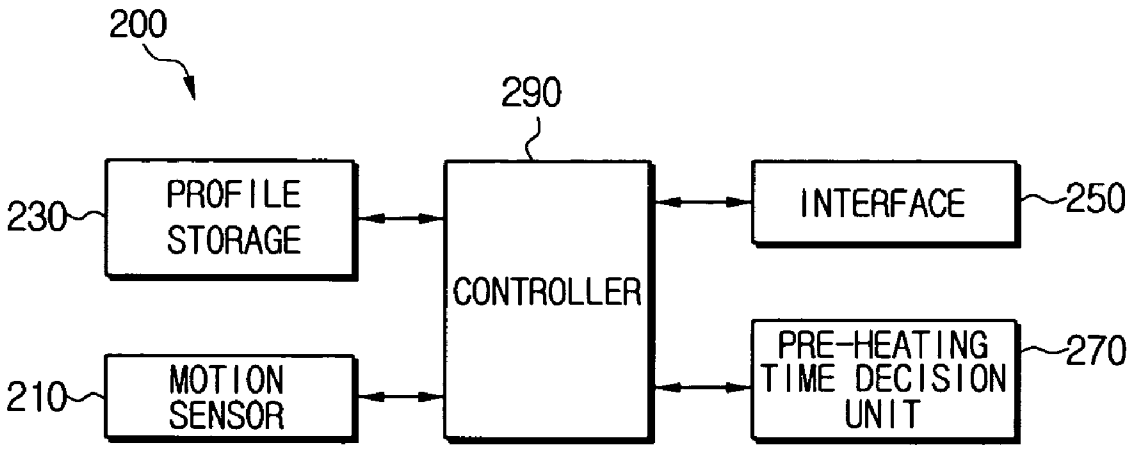
FIG. 2 is a block diagram illustrating a pre-heating system usable with the image forming device of FIG. 1, according to an embodiment of the present general inventive concept.

FIG. 2 is a block diagram illustrating a pre-heating system 200 usable with the image forming device of FIG. 1, according to an embodiment the present general inventive concept. As shown in FIG. 2, the pre-heating system 200 comprises a motion sensor 210, a profile storage 230, an interface 250, a pre-heating time decision unit 270, and a controller 290.

The pre-heating system 200 can be either built into the user terminal, or can be installed as an individual hardware, and is connected to at least one user terminal.

When the user initiates an application program in the user terminal, the motion sensor 210 senses a program operation pattern of the user according to time, such as the application usage start time, the print command input time, the application end time, and so on.

The program operation pattern of the user sensed by the motion sensor 210 is put on a list and is stored in the profile storage 230 under a name of a behavior profile of the user. Each user has his own behavior profile. Therefore, the behavior profile of the user is managed individually for respective users and according to what type of application program is used. Further, the behavior profile of the user can be stored or managed by using a number of parameters representing the characteristics of the program operation pattern of the user.

The pre-heating time decision unit 270 determines when to start pre-heating the image forming device by using the behavior profile of the user stored in the profile storage 230 to determine how much time should pass after the application start time before pre-heating the image forming device. This may be performed by comparing the information of the behavior profile with an amount of time that elapses.

The behavior profile of the user can list the application start time, total execution time of the printing process, and the like. Based on the behavior profile of the user, the pre-heating time decision unit 170 calculates a probability value of the user inputting a print command with respect to time, and computes a time zone where the probability value exceeds a threshold value.

Also, the pre-heating time decision unit 270 counts time as soon as the user starts the application program, and within the time zone where the converted time-based probability value exceeds the threshold value, the pre-heating time decision unit 270 issues a pre-heating start command to the printer 100.

The controller 290 of the pre-heating system 200 controls the operations of the motion sensor 210 and the profile storage 230. Also, the controller 290 receives the pre-heating start command issued by the pre-heating time decision unit 270, and transmits a pre-heating start signal to the printer 100 through the interface 250.

Upon receiving the pre-heating start signal from the pre-heating system 200, the controller 190 of the printer 100 controls the heat lamp 171 of the fixing unit 170 to preheat the printer 100.

Meanwhile, the pre-heating system 200 may further include an input unit (not shown), so that it is possible to predetermine whether the motion sensor 210 should sense the user's behavior, whether the pre-heating time decision unit 270 decides pre-heating time, and whether the printer 100 should be preheated. Therefore, it is possible to preset the pre-heating system 200 to sense the user's behavior but not to perform the pre-heating process.

The pre-heating system 200 ensures that the printer 100 performs the pre-heating process within the time zone computed by the pre-heating time decision unit 270. In addition, the pre-heating system 200 can convert a hit rate of the computed time zone versus the time when the printing process is actually carried out to a probability value, and reflect the probability value on the behavior profile of the user to use later when computing the pre-heating time zone.

Figure 3:
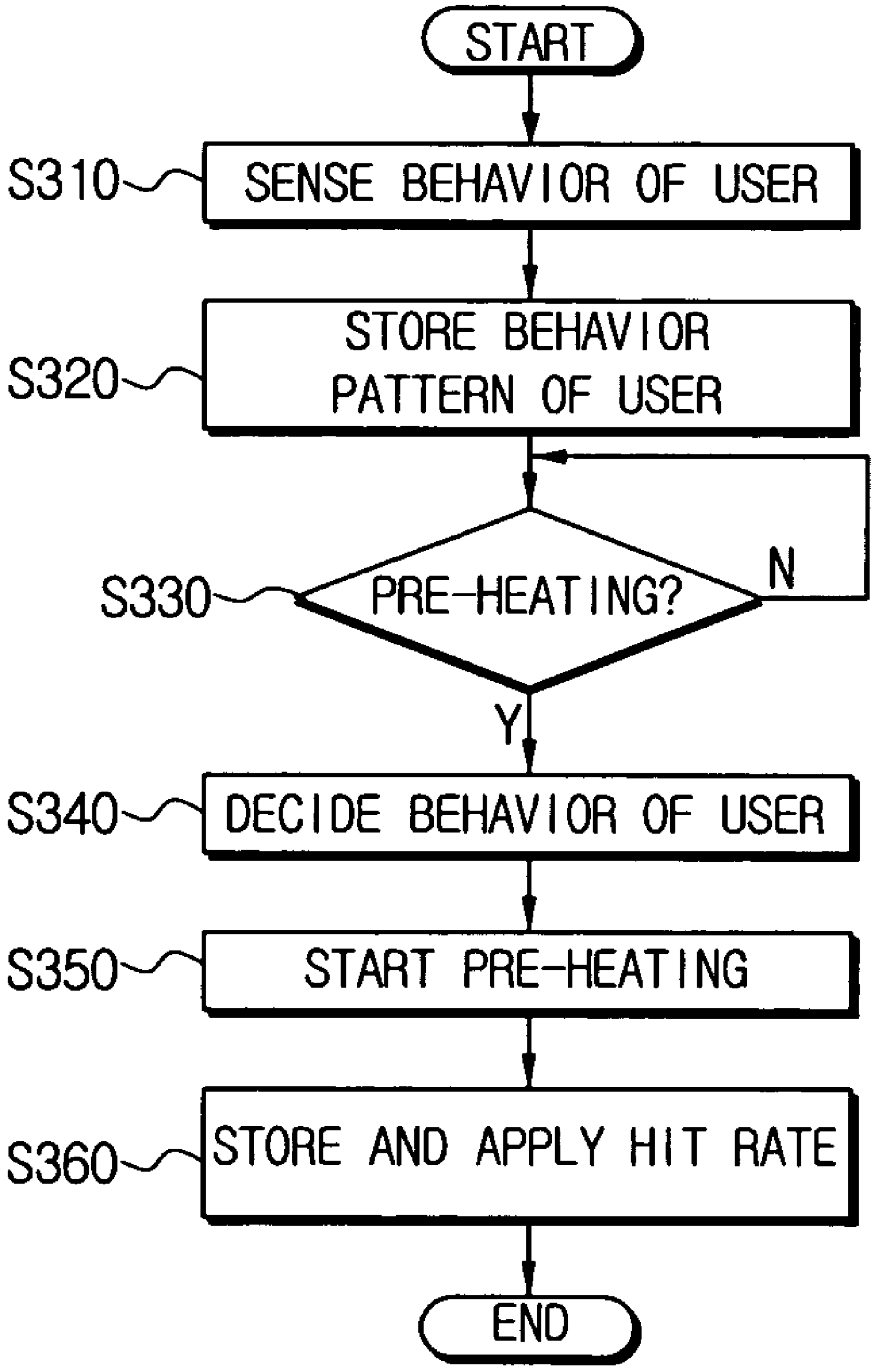
FIG. 3 is a flowchart illustrating a pre-heating method of the image forming device of FIG. 1 according to an embodiment of the present general inventive concept.

FIG. 3 is a flowchart illustrating a method of preheating an image forming device according to an embodiment of the present general inventive concept.

When the pre-heating system 200 to preheat the image forming device starts running, the motion sensor 210 senses a program operation pattern of the user, such as when the user starts using the application program of the user terminal, that is, the application usage start time, the print command input time and the application end time (operation S310).

Next, the program operation pattern of the user sensed by the motion sensor 210 is put on a list under the name of the behavior profile of the user, and is stored in the profile storage 230 (operation S320). The behavior profile of the user is managed individually for different users and according to what kind of application program is used. Moreover, the behavior profile of the user can be stored or managed by using a number of parameters representing the characteristics of the user's behavior.

Then, it is determined whether the pre-heating system 200 is set to execute the pre-heating process of the printer 100 (operation S330), and if so, the pre-heating time decision unit 270 analyzes the behavior profile of the user stored in the profile storage 230 to statistically calculate the time zone when the probability of the user to start printing exceeds the predetermined threshold value (operation S340). When the user starts an application, the pre-heating time decision unit 270 counts time from the application usage start time, and issues a control command to the printer 100 to start pre-heating punctually at the calculated time zone (operation S350).

After the pre-heating system 200 preheats the printer 100, it converts the hit rate of the pre-heating execute time calculated by the pre-heating decision unit 270 versus the time when the printing process is actually carried out into a probability value, and reflects the probability value on the behavior profile of the user to use later when calculating the pre-heating time zone (operation S360).

As described above, a user's behavior profile-based statistic data is advantageously used to pre-heat a printer. Therefore, when the user inputs a print command, the printer immediately performs a printing process without a time delay.

Since an image forming device is preheated with an application of the user's behavior profile-based statistic data, it is possible to prevent an unnecessary delay in printing and to preheat the image forming device only as needed, thereby reducing a waste of resources.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of pre-heating an image forming device, the method comprising:

sensing, according to time, program operation patterns of at least one user executing at least one application program of at least one terminal, in order to perform data printing by using an image forming device;

storing the program operation patterns of each user according to time as a user profile, respectively; and if one of the users executes the application program of the terminal, counting time, and when an amount of time determined based on the user profile passes, pre-heating the image forming device.

2. The method according to claim 1, wherein the program operation pattern comprises at least one of an application usage start time, a data print command input time from the start time, and an application end time.

3. The method according to claim 1, wherein the user profiles are managed by at least one parameter between the users and the application programs, respectively.

4. The method according to claim 1, wherein the determined amount of time falls in a time zone where a probability value for the user to input a print command based on the user profile exceeds a predetermined threshold value.

5. The method according to claim 1, further comprising:

if a print command is input by the user using the user terminal, calculating a hit rate of a pre-heating execute time to a print command input time, and reflecting the hit rate on the user profile.

6. A pre-heating system usable with an image forming device, comprising:

a motion sensor to sense, according to time, program operation patterns of at least one user executing at least one application program of at least one terminal, in order to perform data printing by using an image forming device;

a profile storage to store program operation patterns of each user according to time as a user profile, respectively; and a pre-heating time decision unit to count time if one of the users executes the application program of the terminal, and to generate a pre-heating start command of the image forming device if an amount of time determined based on the user profile passes.

7. The system according to claim 6, wherein the program operation pattern of each user comprises at least one of an application usage start time, a data print command input time from the start time, and an application end time.

8. The system according to claim 6, wherein the user profiles are managed by at least one parameter among at least one of the users and the application programs, respectively.

9. The system according to claim 6, wherein the pre-heating start command is generated in a time zone where a probability value for the user to input a print command based on the user profile exceeds a predetermined threshold value.

10. The system according to claim 6, wherein if a print command is input by the user using the user terminal, the pre-heating time decision unit calculates a hit rate of the time at which the pre-heating start command is generated to the time at which the print command is input, and reflects the hit rate on the user profile.

11. A pre-heating system usable with an image forming device including a heat source, comprising:

a sensor to sense program operation patterns of a plurality of users according to time, with respect to at least one application program performed on each of a plurality of terminals respectively used by the plurality of users;

a storage to store the program operation patterns as a plurality of behavior profiles corresponding to the plurality of users;

a preheating time decision unit to determine when to activate the heat source of the image-forming device based on the plurality of behavior profiles corresponding to the plurality of users;

a controller to generate a pre-heat signal to activate the heat source of the image forming device; and a communication part to communicate with the image forming device to transmit the pre-heat signal to the image forming device.

12. The pre-heating system according to claim 11, wherein the sensor comprises a motion sensor to sense when the application is initiated in one of the plurality of terminals by one of the plurality of users, and to sense the program operation patterns of the one of the plurality of users using the application program according to time.

13. The pre-heating system according to claim 12, wherein the program operation patterns of each of the plurality of users comprise:

at least one of an application usage start time, a print command time, and an application end time.

14. The pre-heating system according to claim 11, wherein the behavior profile of each of the plurality of users is stored or managed according to what type of application is used.

15. The pre-heating system according to claim 11, wherein the behavior profile of each of the plurality of users is stored or managed according to characteristics of the program operation patterns stored in each behavior profile.

16. The pre-heating system according to claim 11, wherein the behavior profile of each of the plurality of users comprises:

at least one of an application start time and a total printing time.

17. The pre-heating system according to claim 11, wherein the pre-heating time decision unit determines when to activate the heating source by determining an amount of time to pass after an application is initiated by one of the plurality of users, and the controller generates the pre-heat signal when the determined amount of time passes after the application is initiated.

18. The pre-heating system according to claim 17, wherein the pre-heating time decision unit determines the amount of time to pass by comparing information stored in the behavior profile corresponding to the one of the plurality of users with an amount of time that elapses.

19. The pre-heating system according to claim 11, wherein the pre-heating time decision unit determines when to activate the heating source by calculating a probability value with respect to time of one of the plurality of users inputting a print command based on the program operation patterns stored in the plurality of behavior profiles, and computing a time range in which the probability value is greater than a threshold value.

20. The pre-heating system according to claim 19, wherein the controller generates the pre-heat signal within the computed time range.

21. The pre-heating system according to claim 20, wherein the computed time range is compared to an actual time at which one of the plurality of users input the print command to generate a hit rate, and the hit rate is stored in the behavior profile corresponding to the one of the plurality of users.

22. The pre-heating system according to claim 21, wherein the stored hit rate is used to adjust the program operation patterns stored in the behavior profile corresponding to the one of the plurality of users.

* * * * *